(No Model.)
C. HOTZ & M. CONRAD.
Cart.
No. 229,133. Patented June 22, 1880.
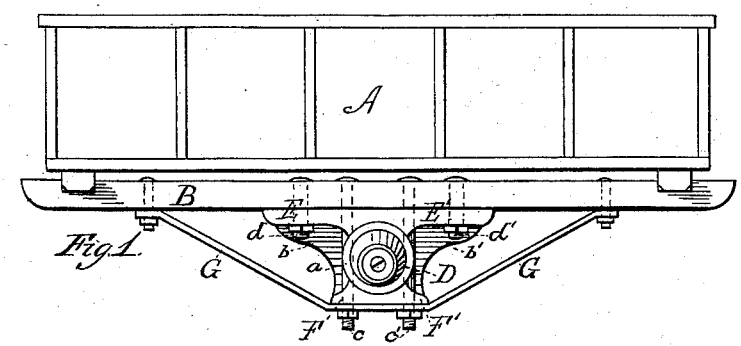
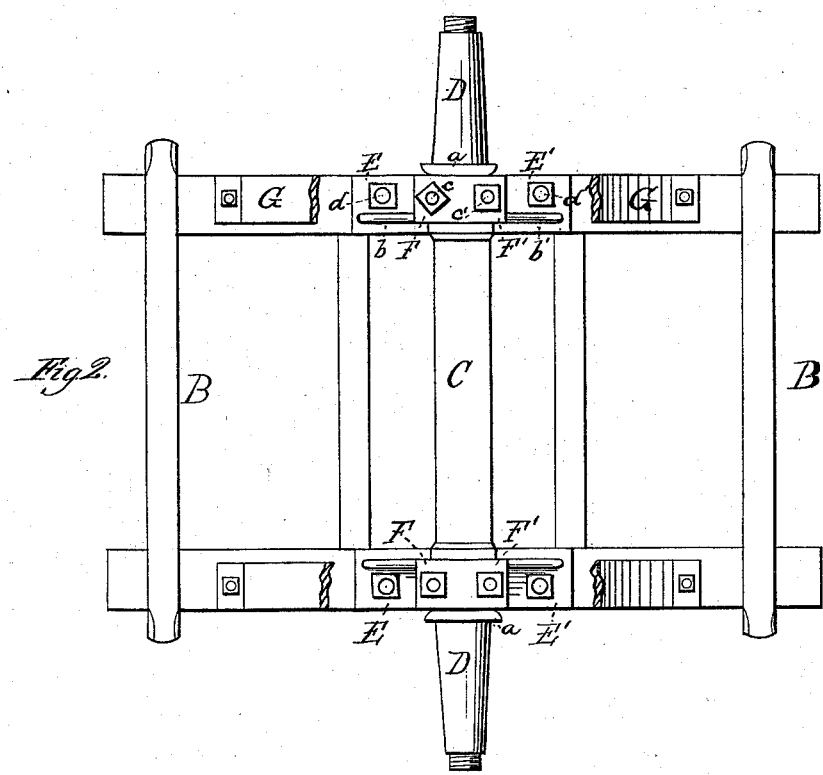
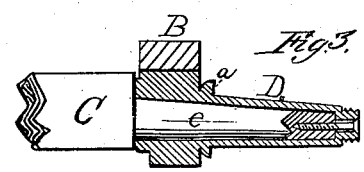
Witnesses:
F. B. Townsend
Rich'd N. Dyer
Inventors:
Christoph Hotz
Martin Conrad
per Wm. H. Lotz
Attorney

UNITED STATES PATENT OFFICE.

CHRISTOPH HOTZ AND MARTIN CONRAD, OF CHICAGO, ILLINOIS; SAID CONRAD ASSIGNOR TO SAID HOTZ.

CART.

SPECIFICATION forming part of Letters Patent No. 229,133, dated June 22, 1880.

Application filed April 15, 1880. (No model.)

*To all whom it may concern:*

Be it known that we, CHRISTOPH HOTZ and MARTIN CONRAD, of Chicago, in the county of Cook and State of Illinois, have invented a certain new and useful Improvement in Carts and Drays, of which the following is a specification.

Heretofore, in the manufacture of carts and drays having wooden axles, the sills of the cart-bed have been secured to the wooden axle, some six or eight inches from the butting-rings of the axle-skeins, either by passing bolts through the axle or by clipping around the same; but by passing bolts through the axle it was very much weakened and would break easily at those points, while when clips were used the shrinkage of the axle would loosen the fastenings and allow the cart-bed to shift to either side, and, in addition, the bearings of the sills upon the axle were placed such a distance from the wheels that the liability of the axle to break was greatly increased.

Now the object we have in view is to overcome all these objections to the use of wooden axles in carts and drays, and this we accomplish by placing the bearings of the cart-bed sills directly upon the axle-skeins, and constructing such skeins so that the sills can be rigidly secured thereto, the said axle-skeins being braced apart and connected together by a wooden axle which is not secured to any part of the cart-bed.

Our invention therein consists in rigidly securing the sills of the cart-bed directly to the axle-skeins; in providing the axle-skeins with bracket-arms which form broad bearings for the cart-sills, and securing such cart-sills to the axle-skeins by bolts passing through the sills and the bracket-arms; in the peculiar construction of the axle-skeins to receive the cart-sills and securing-bolts; and, further, in the combination, construction, and arrangement of the principal parts, all as fully hereinafter explained.

In the accompanying drawings, forming a part hereof, Figure 1 is an elevation of the cart body, bed, and axle, showing our improvement; Fig. 2, a bottom view of the cart-bed and the axle; and Fig. 3, a vertical section through one of the axle-skeins and the cart-sill, showing in elevation the end of the axle and the wheel-arm on the same.

Like letters denote corresponding parts in all three figures.

A is the cart-body; B, the cart-bed; C, the wooden axle, and D the axle-skeins.

The cart-body is rigidly secured to the cart-bed in the usual manner. The extension of each axle-skein inside of the butting-ring *a* is provided on its upper side with bracket-arms E E′, cast therewith, extending on each side, and forming a single broad bearing-surface for the cart-sill. The lower side of this extension of the axle-skein is cast with smaller laterally-extending flanges F F′, which, to give additional strength, are connected with the arms E E′ by bracket-ribs *b b′*.

The axle-skeins are secured to the sills of the cart-bed by bolts *c c′*, which pass down through the sills and through the bracket-arms E E′ and flanges F F′ close to the sides of the axle-skeins, and by other bolts, *d d′*, which only pass through the bracket-arms E E′.

The axle-skeins may be additionally secured by side braces, formed by metal straps G, which pass under the flanges F F′ and are held at their centers by the bolts *c c′*, and at their ends are secured to the sills by other bolts; but these braces can be dispensed with in the cheaper styles of carts and drays.

The axle C has the usual wheel-arms *e*, which enter the axle-skeins; but this axle is not secured directly to any portion of the cart-bed.

It will be seen that by this construction the axle is relieved from nearly all strain, it is not weakened by having bolts passed through it, and the cart-bed cannot possibly shift from its position. The liability of any of the parts to break is also reduced to the minimum by the location of the bearings of the cart-sills upon the axle-skeins close to the hubs of the wheels. This manner of securing the skeins also prevents them from working off of the axle.

This device is practically only applicable to a two-wheel dumping-cart or dray having a body or box rigidly secured to the bed, the bed in this case being rigidly secured to the axle-skeins.

The bracket-arms E E' form broad bearings for the cart-sills, which are secured by the bolts passing down through them and through the bracket-arms, so that the cart bed and body cannot shift when the wood shrinks.

What we claim as our invention is—

1. In a two-wheel cart or dray, the combination of the cart-body A and bed B, rigidly secured together, with the axle-skeins and the wooden axle, the sills of the said cart bed being rigidly secured directly to the axle-skeins, substantially as described and shown.

2. In a two-wheel cart or dray, the axle-skeins D, having bracket-arms E E', cast therewith and forming broad bearings for the cart-sills, in combination with the cart-bed B, resting upon such bracket-arms and rigidly secured thereto by bolts which pass through the cart-sills and the said bracket-arms, and the cart-body A, rigidly secured to the bed B, substantially as described and shown.

3. In a two-wheel cart or dray, the axle-skeins D, having bracket-arms E E' and flanges F F', substantially as and for the purpose set forth.

4. In a two-wheel cart or dray, the combination, with the cart-bed B, of the axle-skeins D, having bracket-arms E E' and flanges F F', and secured to the cart-sills, as described, and the wooden axle C, having wheel-arms entering the axle-skeins, substantially as and for the purpose set forth.

CHRISTOPH HOTZ.
MARTIN CONRAD.

Witnesses:
RICHD. N. DYER,
OLIVER W. MARBLE.